United States Patent [19]
Regenbrecht

[11] 3,909,151
[45] Sept. 30, 1975

[54] DRILLING DEVICE
[75] Inventor: Ludwig Regenbrecht, Gevelsberg, Germany
[73] Assignee: Werner Peddinghaus, Sprockhovel-Hasslinghausen, Germany
[22] Filed: Feb. 4, 1974
[21] Appl. No.: 439,620

[30] Foreign Application Priority Data
Feb. 2, 1973 Germany............................ 2305133

[52] U.S. Cl................................. 408/140; 408/35
[51] Int. Cl.² ..................... B23Q 5/22; B23B 39/20
[58] Field of Search ............... 408/35, 31, 117, 140; 29/568

[56] References Cited
UNITED STATES PATENTS
2,227,582  1/1941  Hillman et al. .................... 408/140
2,738,691  3/1956  Schwab............................. 408/117
FOREIGN PATENTS OR APPLICATIONS
1,903,499  1/1968  Germany ............................. 408/35
5,129      3/1908  United Kingdom................... 408/35

Primary Examiner—Donald R. Schran
Assistant Examiner—W. R. Briggs
Attorney, Agent, or Firm—Walter Becker

[57] ABSTRACT

A drilling device with a drilling spindle and a turret comprising a plurality of tool holders respectively adapted to be brought into axial alignment with the drilling spindle, which includes a first friction clutch, a positive clutch, and a second frictional clutch with corresponding clutch section associated with the drilling spindle and each tool holder. These three clutches are so arranged that when a tool holder is in axial alignment with the drilling spindle and the latter while being rotated is moved toward the respective tool holder aligned therewith, first the first friction clutch, then the positive clutch, and last the second friction clutch becomes effective.

10 Claims, 3 Drawing Figures

U.S. Patent   Sept. 30, 1975   3,909,151
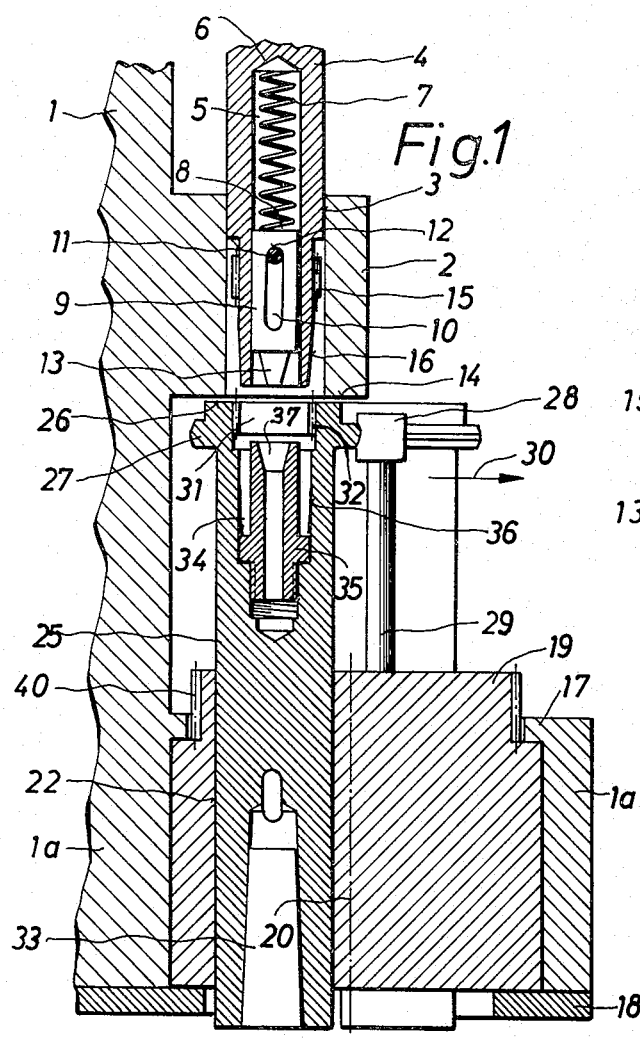
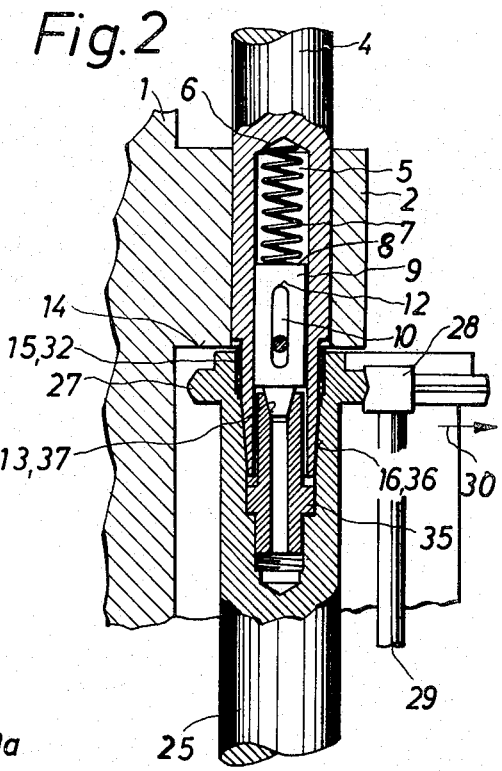
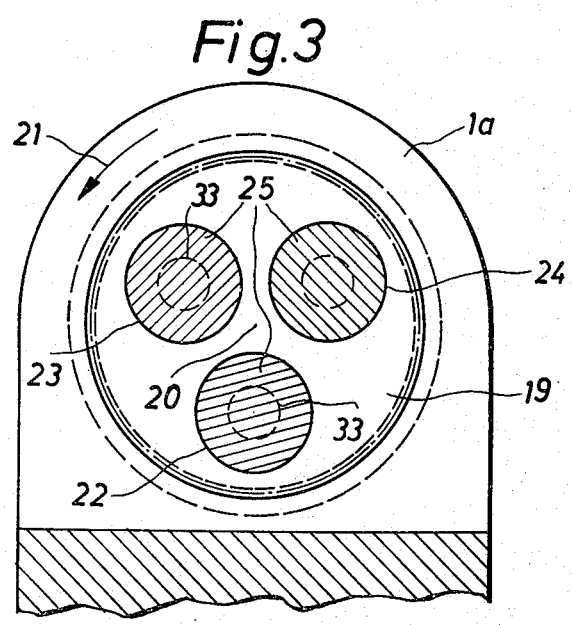

DRILLING DEVICE

The present invention relates to a boring device with a boring spindle and a magazine with tool holders having conical bores for detachably holding the tool shank, said mechanism being movable in a vertical plane in front of said boring spindle.

Boring devices have become known which have associated therewith a tool mechanism from which the respective tool required for the desired boring operation is withdrawn and is conveyed to the boring spindle. Either the tool or the tool holder or the mechanism may be provided with a coding by means of which the tool passes into its exchange position.

Devices of this type used in connection with boring mills are rather expensive and are intended for a greater number of tools. To this end transfer devices are provided between the magazine and the drilling spindle. By means of such transfer devices, the used tool as well as the tool intended for the new boring operation is withdrawn from the magazine and is inserted into the boring spindle and vice versa. The heretofore known boring devices have generally a bulky construction for which, for purposes of transmitting the full torque from the boring spindle to the tool, major structural parts are necessary. Moreover the connection of the tool or tool holder with the boring spindle is generally to be effected with the spindle at a standstill.

It would be possible, particularly with a smaller number of tools to couple the tool without a transferring device from a magazine to the tool spindle, with the latter. In such an instance, however, difficulties would be encountered as before namely to transfer the full torque from the boring spindle to the tool, and also to maintain a small overall size. Furthermore, when withdrawing the tool, a lost stroke would have to be put up with over which the spindle wuld have to be moved prior to being able to disconnect the connection between the boring spindle and the tool or tool holder. Finally, a coupling of the tool or tool holder to the rotating boring spindle could not be realized.

It is, therefore, an object of the present invention to provide a boring device of the above mentioned general type which will be characterized not only by a small overall structure but will also permit the transfer of a full torque from the boring spindle to the boring tool while being adapted during the withdrawal of the tool from the workpiece to disconnect the tool or tool holder from the boring spindle without the necessity that the spindle prior to the disengagement from the tool has to perform an additional disengaging stroke.

It is another object of this invention to provide a boring device as set forth in the preceding paragraph according to which the coupling and disengagement of tool and tool holder with and from the rotating boring spindle will be possible while the device will be simple and inexpensive in construction.

These and other objects and advantages of the invention will appear more clearly from the following specification in connection with the accompanying drawings, in which:

FIG. 1 represents a diagrammatic section through the magazine with the tool holder and the boring or drilling spindle in the guiding of the latter in the starting position of the movable parts, according to the present invention.

FIG. 2 shows the coupling position of the boring spindle with the tool holder.

FIG. 3 illustrates the dial plate as magazine.

The boring device according to the present invention which is provided with a boring spindle and a magazine with tool holders movable in a vertical plane in front of the boring spindle is characterized primarily in that the tool holders which are rotatably and longitudinally adjustable in the magazine are movable by the magazine into a position coaxial with the drilling spindle and by means of spring catch or spring detent are held in their starting position in the magazine, and is furthermore characterized in that the respective tool holder occupying a coaxial position with the boring spindle is adapted by means of a yieldable clutch which is effective when connecting the tool holder and boring spindle with each other, and through a rigid torque coupling and a second axial coupling, to be coupled to the boring spindle.

While the spring detent which holds the tool holder in its starting position in the magazine and is adapted to free the tool holder for feeding in the magazine while a turning of the tool holder in this starting position is possible, the yieldable clutch first connects the continuously rotating boring spindle with the tool holder in such a way that the tool holder is placed into a rotary movement so that during a further longitudinal displacement of the boring spindle relative to the tool holder the rigid torque coupling and subsequently the axial coupling between the boring spindle and the tool holder become effective. While thus the yieldable coupling brings about a yieldable rotary pickup of the tool holder, the axial coupling aims to create such a connection between the boring spindle and the tool holder that during the withdrawal of the tool holder to its starting position, the tool holder remains coupled to the boring spindle until the tool holder has reached its starting and end position in the magazine.

To this end, the spring force of the spring detent is greater than the spring force acting upon the yieldable clutch. Therefore, first the yieldable clutch and subsequently other couplings become effective prior to the tool holder being relieved from the yieldable spring detent.

According to a practical embodiment of the invention, the spring detent is formed by an outer ring on the tool holder and a sliding or rolling head which is resiliently mounted and engages the ring or sliding or rolling head from below or from behind.

The yieldable clutch may consist of a conical part and an inner cone connected to the tool holder, said conical part being spring urged and being limited in its movement in the spindle. The conical part of the boring spindle is preferably formed by a cylindrical pivot, one end of which carries the cone. The said pivot is provided with a slot extending in the longitudinal direction of the pivot while a bolt extends through that slot and is held in the wall of the boring spindle, said bore receiving a spring acted upon by said conical part. As mentioned above, this spring is as to its effective spring force weaker than the spring force of the spring detent by means of which the tool holder is held in its starting position in the magazine. Preferably this magazine is a drum magazine the axis of which extends parallel with regard to the axis of the boring spindle.

According to a further development of the invention, the lower boring spindle section which recess comprises the bore for receiving the movable conical part, is provided with a gear ring and an outer cone, whereas the tool holder has a corresponding inner cone and inner teeth. The gear ring and the inner teeth form the rigid torque coupling, whereas the outer and inner cones represent the second axial clutch by means of which the tool holder will be connected to the boring spindle.

Preferably, the spring force of the spring detent is so great that the spring detent will be relieved only when also the parts of the second clutch are in sufficient clutch engagement. However, the spring detent may also be secure and the second axial clutch may be effected by the boring pressure in such a way that when withdrawing the boring spindle, the tool holder is withdrawn to its starting position in the magazine. The tool holder then hits a stationary part whereby it is detached from the boring spindle. This means that when withdrawing the boring spindle, first the axial clutch and subsequently the gear clutch and finally also the yieldable clutch are disengaged. To this end, the tool holder has its upper end provided with a shoulder with which the tool holder for disengaging the boring spindle will during the return movement of the boring spindle to its starting position abut a counter-shoulder on the spindle guiding device as a stationary part.

According to a further advantageous development of the invention, the teeth of the gear ring of the boring spindle and the inner teeth of the tool holder taper at their adjacent end faces.

Furthermore, the gear ring and the outer cone of the drilling spindle as well as the inner teeth and the inner cone of the tool holder are in boring direction arranged one behind the other in such a way that the gear ring engages the outer teeth prior to the surfaces of the two mentioned cones frictionally engage each other.

Referring now to the drawings in detail, the frame 1 of the device comprises a laterally projecting part 2 having provided therein a bore 3 for partially receiving and guiding a boring spindle 4. The journalling of the spindle in the frame or housing 1 is not illustrated in order not to unnecessarily clog up the drawing.

The lower end of the boring spindle 4 has a bore 5, the end face 6 of which forms the counterbearing for a spring 7 in bore 5. The other end of spring 7 rests against the end face 8 of a cylindrical pivot 9 which is longitudinally displaceably arranged in bore 5 and in its axial direction has a longitudinal slot 10. A bolt 11 having its ends mounted in the wall of bore 5 of the boring spindle 4 extends through slot 10 in such a way that, as illustrated in FIG. 1, one end position of pivot 9 is determined by abutment of bolt 11 against the upper end face 12 of slot 10. In this starting position, the pivot 9 is held by spring 7. That lower end of the cylindrical pivot 9 which faces away from spring 7 is provided with a cone 13.

It is important that the location of the slot 10 as well as the length of the cylindrical pin 9 and the cone 13 are so selected that the cone 13 in the starting position of the drilling spindle 4 (FIG. 1) does not project beyond the lower edge 14 of part 2 of frame 1 and that the cone does not extend into the part of movement of those parts of the device which are located below said edge.

The lower end of the drilling spindle 4 is at one outer side tapered and at approximately the level of the pin 9 is provided with gear ring 15 followed by an outer cone 16.

In the lower section 1a of the frame 1, a magazine 19 adapted to revolve is held and guided by a shoulder 17 and a closure plate 18. This magazine 19 is adapted to be rotated about the axis 20 in the direction of the arrow 21 or in counterdirection (FIG. 3), said axis 20 being substantially parallel to the longitudinal axis of the drilling spindle 4. Magazine 19 may comprise non-illustrated means of any known type for arresting magazine 19 in certain positions and relieving said magazine from these positions.

In the particular embodiment shown in the drawing, the magazine has three bores 22, 23 and 24 of which FIG. 1 shows the bore 23. The bores 22, 23 and 24 are preferably identical and are so designed that the tool holder 25 is rotatable therein and is displaceable in its longitudinal direction. The tool holder 25 is displaceable in its longitudinal direction in said bores and at its upper end has a shoulder 26 so that the tool holder 25 when moving upwardly will have its shoulder abut the lower edge 14 of part 2 whereby the upward movement of the tool holder 25 is limited.

The tool holder 25 furthermore comprises an outer ring 27 which has a peripheral surface that is roof-shaped in cross section. Outer ring 27 cooperates with a sliding or rolling head 28 of a spring rod 29, the lower portion of which is held in the magazine 19. Rod 29 may if desired also be replaced by a corresponding spring which permits the sliding or rolling head 28 to escape in the direction of the arrow 30 so that the tool holder 25 in FIG. 1 can escape downwardly when the drilling spindle 4 imparts a corresponding movement upon the tool holder 25. Ring 27 and sliding or rolling head 28 are so arranged in design that the tool holder 25 is held in its starting and end position secured so that it will nevertheless be possible for a brief period of time for the tool holder 25 in said position to carry out a rotary movement. To this end, the part 28 may be designed for instance as a roller which at its periphery has a contour corresponding to the outer periphery of ring 27.

The tool holder 25 has a bore 31, the wall of which is provided with inner teeth 32 which are so designed in the range that the gear ring 15 of the drilling spindle 4 may mesh therewith. For facilitating the engagement of the gear ring 15 with the inner teeth 32, those end face edges or rims of the teeth of both parts which face each other are inclined in a wedge-shaped manner.

The bore 31 in the tool holder 25, which latter has a cone 33 for receiving the drilling tooth, is followed by a bore 34 for receiving a sleeve 35. The bore 34 furthermore forms an inner cone 36 which corresponds to the cone 16 of the drilling spindle 4. Sleeve 34 has its upper part provided with an inner cone 37 which corresponds in contour to the cone 13 of the pin 9 of drilling spindle 4.

The spring force with which the sliding or rolling head 28 holds the tool holder 25 in its position shown in FIGS. 1 and 2 is always greater than the spring force with which the spring 7 acts upon the pin 9 so that the drilling device according to the invention will operate in the following manner.

In its starting position, the various parts occupy the position shown in FIG. 1 in which the pin 9 is depressed downwardly by spring 7 so that the bolt 11 engages the adjacent end wall 12 of the slot 10. The drilling spindles 4 and their movable parts do not project downwardly beyond the lower edge 14 of part 2 so that the magazine 19 can for instance by means of the gear ring 40 be turned into a position in which one of the bores 22, 23 and 24 of the magazine 19 with the respective tool holder and the tool therein is precisely in axial alignment with the boring spindle 4 thereabove and is arrested in this position. During the then following drilling operation, the non-used tools may be exchanged for new ones.

In the starting position shown in FIG. 1, the drilling spindle 4 carries out a rotary movement.

When lowering the rotating drilling spindle 4, first the spring loaded cone 13 engages the inner cone 37 so that in this way a yieldable rotary coupling of the drilling spindle 4 with the tool holder 25 is effected. Therefore, tool holder 25 is accelerated to the rotary speed of the drilling spindle 4 until both parts 25 and 4 carry out a synchronous rotary movement. During a further longidutinal movement of the drilling spindle 4 in downward direction, the teeth of the gear ring 15 of drilling spindle 4 come into mesh with the inner teeth 32 of the tool holder 25 while the conical coupling to which end only a slight escape of the conical clutch 13, 37 to one or the other direction in the rotary direction of the parts is necessary, and this is possible because the teeth are slanted in a wedge-shaped manner. In this way a fixed or positive torque coupling is created between the drilling spindle 4 and the tool holder 25.

During a further downward movement of the drilling spindle 4, the outer cone 16 engages the flat inner cone 36 of sleeve 35 so that an axial coupling is obtained which interconnects the drilling spindle 4 and tool holder 25. Subsequently in response to a further advance of the spindle 4 in downward direction, the resistance of the spring of the spring detent 27, 28, 29 is overcome by the part 29 escaping in the direction of the arrow 30, and the drilling operation can be effected on the workpiece not shown in the drawing.

After the drilling operation has been completed, the drilling spindle 4 preferably while in rotation is pulled back. The clutch 16, 36 sees to it that immediately with the withdrawal of the drilling spindle 4 also the tool holder 25 and the tool are withdrawn which means that no dead period is required for withdrawing the drilling spindle 4. The tool holder 25 with the tool is pulled back until the shoulder 26 engages the lower edge 14, of part 2. Prior to the abutment of shoulder 26 against the edge 14, ring 27 has due to the spring back of the spring rod 29 reached the level of the sliding or rolling head 28 so that after the tool holder 25 has disengaged the spindle 4 in view of the shoulder 26 abutting against edge 14, the tool holder 25 is held in its starting position shown in FIG. 1.

When the tool holder 25 abuts at part 2, it will be appreciated that during further rearward movement of drilling spindle 4, in other words, during upward movement of the latter, drilling spindle 4 will disengage itself from the tool holder 25 inasmuch as the conical areas 16 and 36 separate from each other. During the course of the spindle movement, also the gear ring 15 disengages the inner teeth 32 and the cone 13 disengages the cone 37. All parts then again occupy the position shown in FIG. 1 so that the magazine 19 can again be rotated about the axis 20.

As will be ascertained from the above, the arrangement of the parts is such that the device has only a small overall size and the coupling and uncoupling can always be effected while the spindle 4 is in rotation.

It is, of course, to be understood that the present invention is, by no means, limited to the specific showing in the drawing but also comprises any modifications within the scope of the appended claims.

I claim:

1. A drilling device which includes in combination: frame means, a drilling spindle rotatably and axially displaceably mounted in said frame means, a turret rotatably mounted in said frame means and rotatable about an axis parallel to the axis of said drilling spindle but eccentrically arranged with regard to the axis of said drilling spindle, said turret being provided with a plurality of bores arranged parallel to each other and having their axes arranged parallel to the axis of said turret and along a circle around said turret axis, the diameter of said circle being such that the extension of the axis of said drilling spindle passes through said circle so that each of said bores can be moved into a position in which its axis is in axial alignment with the axis of said drilling spindle, a plurality of tool holders respectively slidably and rotatably arranged in said bores and each being movable by said turret into axial alignment with said drilling spindle, yieldable arresting means associated with said turret and operable yieldably to hold each of said tool holders in a starting position to prevent axial movement of said tool holder while the respective tool holder is in axial alignment with said drilling spindle, each of said tool holders comprising rigidly mounted first frictional clutch means and second frictional clutch means and also positive clutch means, and said spindle comprising a yieldably mounted first frictional clutch section and a positive clutch section and a second rigidly mounted frictional clutch section for respective and successive cooperation directly with the first clutch means and the positive clutch means and the second clutch means of the respective tool holder axially aligned with said tool holder in response to the spindle moving axially toward said aligned tool holder.

2. A drilling device in combination according to claim 1, in which said yieldable arresting means includes spring detent means.

3. A drilling device in combination according to claim 2, in which said spring detent means includes flange means provided on that end portion of said tool holder means which is adjacent said drilling spindle and also includes resiliently mounted catching means for engagement with said flange means.

4. A drilling device in combination according to claim 2, in which said drilling spindle has an axial bore, and in which said first frictional clutch section includes a spring loaded pin slidable in said last mentioned bore and provided with a conical end, whereas said first clutch means includes an axial bore coaxial with and adjacent said last mentioned bore when the respective tool holder is in axial alignment with said drilling spindle, and in which said first clutch means also includes insert means in said axial bore of said tool holder and provided with a conical surface for frictional engagement with said conical end.

5. A drilling device in combination according to claim 4, in which said pin is provided with a slot extending in axial direction of said pin, and which comprises a bolt stationarily supported by said drilling spindle and extending through said slot, spring means being arranged in said axial bore of said drilling spindle and continuously urging said pin in the direction toward said turret.

6. A drilling device in combination according to claim 1, in which that end portion of said drilling spindle which is closest to said turret is provided with outer peripheral teeth forming said positive clutch section and is also provided with an outer cone forming said second frictional clutch section, and in which said axial bore of each of said tool holders is provided with a conical surface corresponding to said outer cone and forming said second frictional clutch means, said axial bore of each of said tool holders also being provided with inner teeth for meshing with said outer peripheral teeth and forming said positive clutch means.

7. A drilling device in combination according to claim 4, in which each of said tool holders has that end thereof which is adjacent the axial bore thereof provided with a shoulder adapted in response to a movement of withdrawal of said tool holder away from said turret to abut against that portion of said frame means which is adjacent said shoulder in the starting position of the respective tool holder.

8. A drilling device in combination according to claim 6, in which said outer peripheral teeth and said inner teeth have their adjacent end faces taper in a wedge-shaped manner.

9. A drilling device in combination according to claim 6, in which said outer peripheral teeth and said inner teeth are arranged relative to said second clutch section and said second clutch means in such a way that said outer peripheral teeth and said inner teeth engage each other prior to said second clutch section engaging said second clutch means.

10. A drilling device in combination according to claim 4, in which said spring loaded pin is under a spring force exceeding the spring force of said spring detent means.

* * * * *